Figures 1, 2:
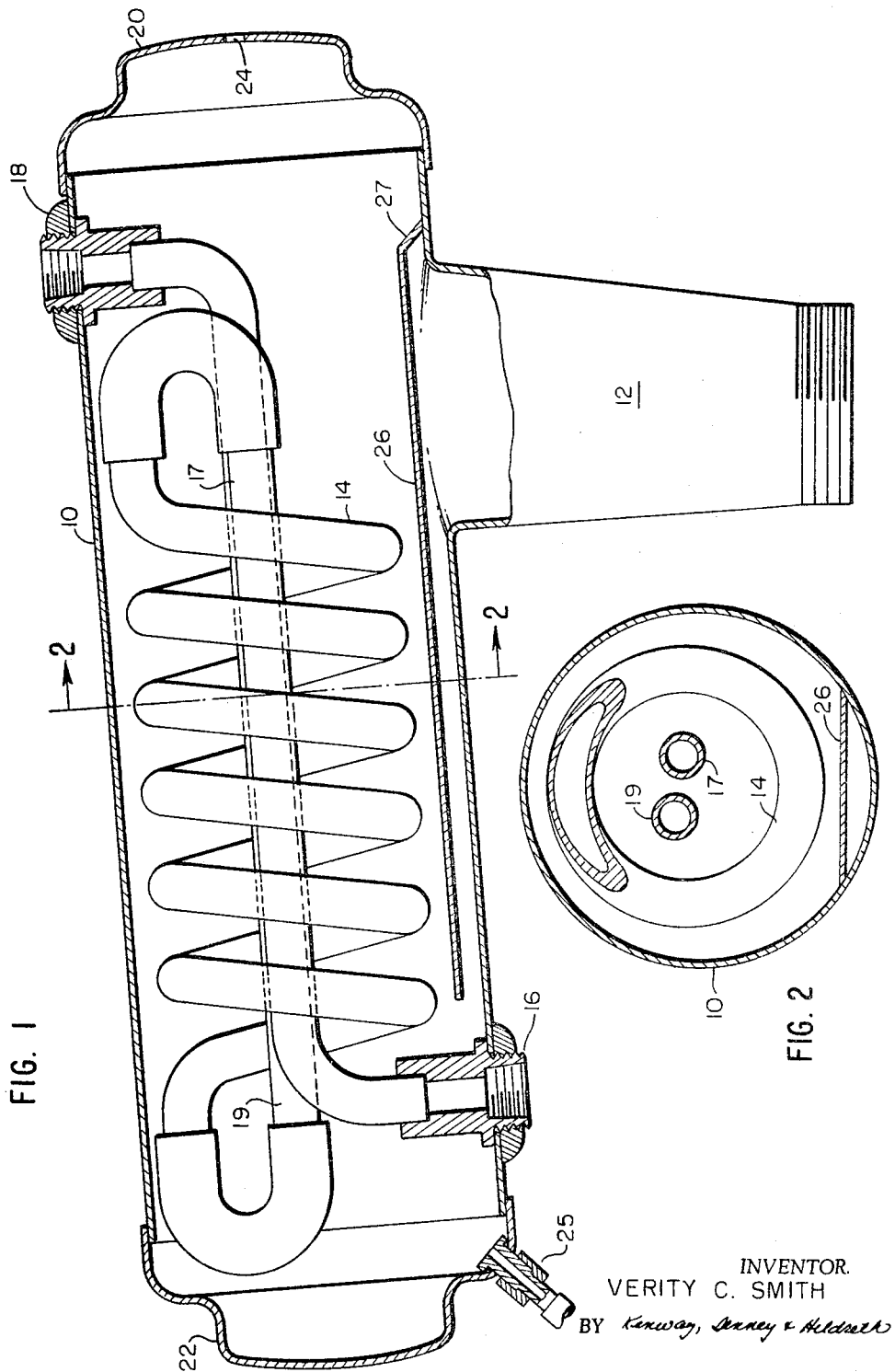

Sept. 13, 1966 V. C. SMITH 3,271,935
CONDENSER FOR REMOVING VOLATILE MATTER FROM DISTILLATE
Filed April 1, 1963

INVENTOR.
VERITY C. SMITH
BY Kenway, Jenney & Hildreth

ATTORNEYS

United States Patent Office 3,271,935
Patented Sept. 13, 1966

3,271,935
CONDENSER FOR REMOVING VOLATILE
MATTER FROM DISTILLATE
Verity C. Smith, Dedham, Mass., assignor to Barnstead Still and Sterilizer Co., Boston, Mass., a corporation of Massachusetts
Filed Apr. 1, 1963, Ser. No. 269,503
1 Claim. (Cl. 55—269)

This invention relates to water distillation apparatus and provides a condenser for producing water of increased purity.

Although distillation is effective to separate water from dissolved solid non-volatile material, it is seldom effective to produce water of absolute purity because of the presence of volatile constituents that are carried over and appear in the distillate. Most notable of these is carbon dioxide. Consequently where water of the highest purity is demanded subsequent treatments are necessary to remove volatile matter.

This invention provides a condenser designed to remove volatile matter, and capable of producing distillate of significantly higher purity, as determined by its ohmic resistivity, than that produced by currently available equipment.

The condenser of this invention includes a generally horizontal elongate housing having a vapor inlet opening in the bottom at one end, and a cooling element within the housing, all of which may be of conventional construction. Improved operation is realized by placing a transverse baffle in the lower portion of the housing, overlying the vapor inlet opening and sloping downwardly beneath the cooling element. The baffle defines a conduit through which incoming steam is directed, and at the same time carries the condensate in heat exchange relation with the steam before it reaches the distillate outlet. Reheating of the distillate by means of the incoming steam is accordingly provided in a simple and efficient manner. In the prefererd embodiment the cooling element is arranged with the cooling water entering at the end farthest from the distillate outlet so that the hot end of the cooling element is nearest to the outlet.

The preferred embodiment of the invention is illustrated in the accompanying drawings in which:

FIG. 1 is a side-elevation in cross section; and
FIG. 2 is a cross section taken at 2—2 in FIG. 1.

As shown in the drawing the condenser of this invention consists in general of a generally tubular housing 10 having a vapor inlet conduit 12 at the bottom near one end, and a helical cooling coil 14 which extends coaxially within the housing from above the vapor conduit 12 to near the opposite end. Cooling water for the coil 14 is introduced through an inlet connection 16 shown in its conventional location at the bottom of the housing opposite the vapor inlet conduit which connects through a tube 17 to the end of the coil 14 nearest the vapor inlet conduit 12, and is removed through a cooling water outlet 18 which connects with the other end of the coil 14 through a tube 19. The ends of the housing 10 are covered by end caps 20 and 22, that at the vapor inlet end being provided with a vent 24, for discharging uncondensable gases, and the other being provided with an outlet fitting 25 through which distillate is removed.

In accordance with this invention, a baffle 26 extends transversely of the housing and lies over the vapor conduit 12 and under the cooling coils 14, extending in a downwardly sloping direction toward the distillate outlet. The end of the baffle 26 adjacent to vapor conduit 12 is formed with a flange 27 that seals against the inside surface of the housing and closes off the space between the baffle and the housing at this end.

In operation, the baffle 26 forms a conduit leading from the vapor inlet conduit 12 to the distillate end of the condenser and also collects distillate from the cooling coil 14 and brings it into heat exchange relation with the incoming steam. When the cooling water is introduced through the inlet connection 16, the coolest condensate which forms at the end of the coil 14 nearest the vapor inlet is caried the farthest and heated the longest by the incoming vapor, while the hottest condensate is heated the least. As volatile matter is more soluble in cold than in hot water, maximum stripping is achieved when the coil 14 is connected in this manner. As a result distillate having a specific resistance of upwards of 1.25 million ohms per cubic centimeter may be readily produced under operations which in conventional apparatus would produce distillate having a resistance of about 500,000 ohms per centimeter.

The condenser of this invention utilizes conventional construction materials, typically tinned copper, the only essential requisite being that the cooling coil 14 and baffle 26 be of good thermal conductivity.

Although the preferred embodiment has been described as utilizing a helical cooling coil, other forms of cooling elements are entirely satisfactory, for instance a bank of parallel tubes extending between header end plates, so long as the condensate is free to fall on to the baffle 26.

Having thus disclosed my invention and described in detail a preferred embodiment thereof, I claim and desire to secured by Letters Patent:

A water distillation condenser comprising a generally horizontally extending elongate housing closed at both ends, a cooling conduit extending substantially the length of said housing, a generally transverse baffle in said housing positioned beneath the cooling conduit and above the bottom of said housing and sloping downwardly from a first end toward the second end of said housing, a water vapor inlet to the interior of said housing adjacent to the first end of said housing, said baffle overlying said water vapor inlet and forming with said casing a chamber to direct incoming steam from the first end toward the second end and thereafter into contact with said cooling conduit, said chamber being closed except for said vapor conduit, said chamber being closed except for said vapor inlet and an opening at the lower end of said baffle, a distillate outlet opening from the interior of said housing adjacent to said second end of said housing and positioned below said water vapor inlet, a vent for uncondensed gases in said housing positioned above said water vapor inlet and adjacent to the first end of said housing, a cooling water inlet connecting to the end of said cooling conduit adjacent to said first end of said housing, and a cooling water outlet connecting to the end of said cooling conduit adjacent to said second end of said housing, said baffle being positioned to collect distillate from said cooling conduit and bring it into counter-current heat exchange relationship with incoming water vapor thereby heating the distillate to remove dissolved uncondensed gases therefrom.

(References on following page)

References Cited by the Examiner

UNITED STATES PATENTS

| | | | |
|---|---|---|---|
| 455,405 | 7/1891 | Knell | 165—114 |
| 1,091,215 | 3/1914 | Hall | 62—285 |
| 1,391,989 | 9/1921 | Zoppel | 55—268 X |
| 1,411,150 | 3/1922 | Barnstead | 165—111 |
| 1,808,087 | 6/1931 | Urquhart | 55—25 X |
| 1,845,540 | 2/1932 | Smith | 165—114 |
| 1,942,131 | 1/1934 | Baumann et al. | 55—27 |
| 1,946,467 | 2/1934 | Bergholm et al. | 165—110 |
| 2,292,032 | 8/1942 | Atchison | 62—283 |
| 2,802,348 | 8/1957 | White | 165—111 X |
| 3,009,537 | 11/1961 | Glasgow et al. | 55—174 |

FOREIGN PATENTS

| | | |
|---|---|---|
| 500,415 | 7/1951 | Belgium. |
| 685,934 | 4/1930 | France. |
| 715,143 | 4/1931 | France. |
| 815,377 | 4/1937 | France. |
| 146,397 | 6/1921 | Great Britain. |
| 41,405 | 5/1913 | Sweden. |

HARRY B. THORNTON, *Primary Examiner.*

REUBEN FRIEDMAN, *Examiner.*

D. TALBERT, *Assistant Examiner.*